United States Patent Office 2,712,323
Patented July 5, 1955

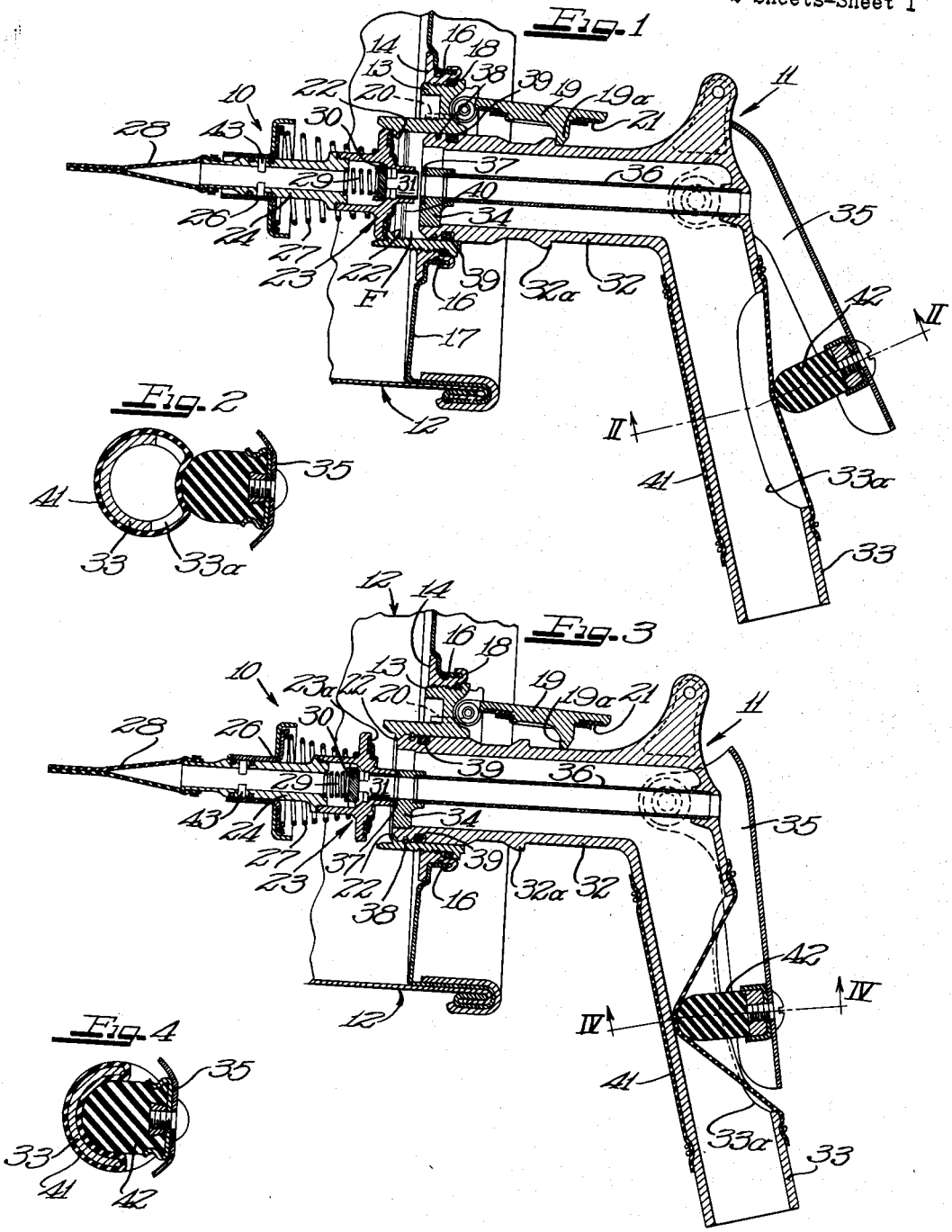

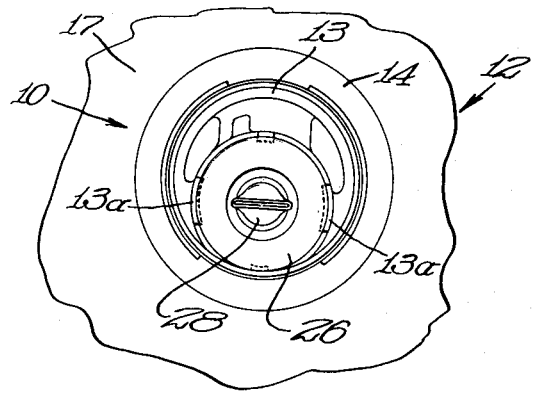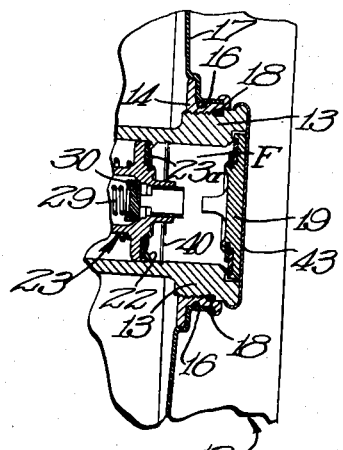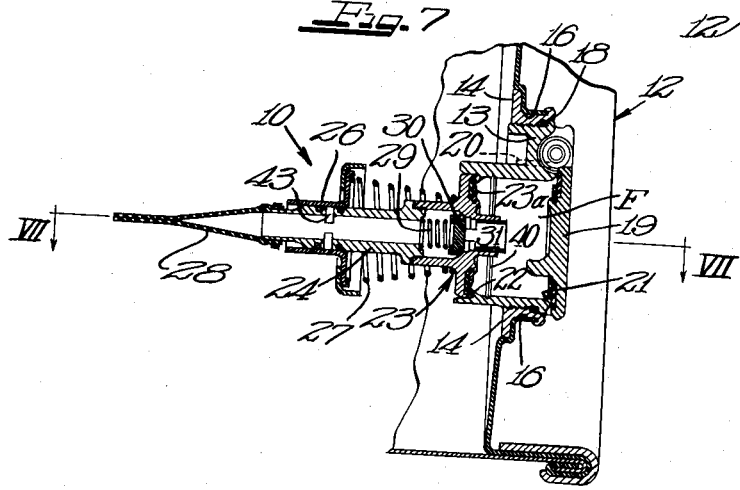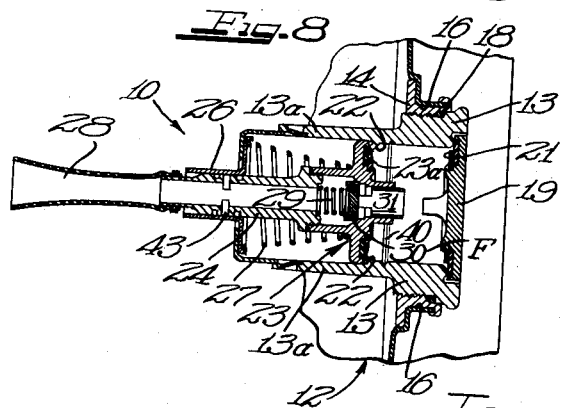

2,712,323
SPIGOT AND ADAPTER FOR AUTOMATIC VENTING

Jacob Rush Snyder and Frank J. Schenkelberger, Cleveland, Ohio, assignors to Thompson Products, Inc., Cleveland, Ohio, a corporation of Ohio Application October 6, 1949, Serial No. 119,892

11 Claims. (Cl. 137—322)

This invention relates to a siphoning mechanism and more particularly an adapter and spigot structure constructed to automatically vent air or fumes to a drum or closed container from which fluid is being drawn.

According to the generel features of the present invention, an apparatus for drawing liquid from a closed container is provided which is adapted for assembly in a conventional container drainage bushing. The adapter is characterized by a generally cylindrical portion which defines a fluid carrying bore or flow passage therein and is further characterized by a valve, preferably a poppet valve, which is normally loaded to a closed position within the flow passage. The valve operates to control the flow of fluid through the adapter element. The adapter further defines an independent air venting passageway which is arranged to extend through the valve structure, as well as through the adapter element. A loaded check valve is located in one end of the venting passageway and a rubber air inlet valve is situated on the other end of the air venting passageway.

The invention further contemplates the provision of a spigot structure which, in one preferred embodiment, takes the form of a pistol-shaped member with a generally tubular barrel portion adapted to be reciprocably positioned in the fluid carrying bore or flow passage of the adapter. The spigot also has a hollow handle portion depending from the end thereof. The hollow handle portion is formed with a window which may be covered by a resilient sheet of flexible material. A lever pivotally mounted on the spigot handle is provided with a protruding finger which, together with the resilient sheet of flexible material, effectively seals off the hollow bore of the spigot structure upon manipulation of the lever.

In operation, the spigot structure may be conveniently gripped as in clinching a pistol to effect a simultaneous operation of the sealing lever. The barrel of the spigot may then be readily inserted into the adapter passageway. Upon entrance into the adapter, the spigot unseats the poppet valve as well as the check valve in the venting duct so that upon release of the lever, the spigot, which has in the meantime been filled with fluid, operates under a siphon effect to produce a highly efficient flow of liquid therethrough. At the same time, if there is little or no fume pressure in the closed container and a vacuum is developed due to withdrawal of liquid, air will freely vent into the container through the independent passageway in proportion to the liquid flow rate.

A dirt eliminating valve is provided for the adapter element and may be equipped with spring loading means and an inwardly projecting lug so that when the desired amount of fluid has been withdrawn, the spigot structure may be simply pulled to a non-flow position whereupon a shoulder on the insertable barrel of the spigot structure will engage the projecting lug of the dirt eliminating valve, thereby positioning the spigot in a convenient fashion for quick withdrawal of additional fluid or speedy disassembly and removal, as may be desired.

It is, therefore, an object of this invention to provide an improved spigot and adapter structure whereby air or fumes may be automatically vented to a drum or closed container from which fluid is being drawn.

Another object of the present invention is to provide an adapter and spigot structure for drawing fluid from a closed container without necessitating the use of removable closures or assembly closures of any kind.

A further object of the invention is to provide a self-venting spigot and adapter structure for a closed fluid container which effectively prevents contamination and evaporation of the container fluid and minimizes corrosion of the container.

Yet another object of the invention is to provide a spigot and adapter structure whereby volatile liquids may be withdrawn from a closed container without permitting the escape of fumes.

Many other objects and advantages of the present invention will become manifest to those versed in the art upon making reference to the detailed description which follows and the annexed sheet of drawings in which a preferred embodiment of the present invention is shown.

On the drawings:

Figure 1 is a longitudinal cross-sectional view, fragmentary in part, and with parts in elevation showing a spigot and adapter structure according to the present invention;

Figure 2 is a detail transverse cross-sectional view taken on line II—II of Figure 1;

Figure 3 is a longitudinal cross-sectional view similar to that shown in Figure 1 and illustrating the relative position of spigot and adapter structural components in one phase of a typical operational sequence;

Figure 4 is a detail transverse cross-sectional view taken on line IV—IV of Figure 3;

Figure 5 is an inside end elevational view, fragmentary in part, showing additional details of construction of the spigot and adapter structure according to the present invention;

Figure 6 is a fragmentary longitudinal cross-sectional view, showing the application of a tamper-proof cap to the adapter structure of the present invention;

Figure 7 is a fragmentary longitudinal cross-sectional view showing the adapter structure with the spigot removed; and Figure 8 is a fragmentary cross-sectional view taken on line VIII—VIII of Figure 7.

As shown on the drawings:

Referring generally to the drawings, a spigot and adapter structure constructed to automatically vent air or fumes to a drum or container from which a fluid such as a highly volatile liquid is being drawn is shown as comprising an adapter 10 and a spigot 11 cooperatively related with an appropriate enclosure such as a drum or container 12.

The adapter 10 is provided with an externally threaded cylindrical portion or bushing ring 13 which may be threadedly assembled with a drum closure bushing 14 suitably secured in the bung hole 16 of a wall 17 defined by the drum or container 12. The adapter 10, once assembled, need not be removed from the drum or container 12 either during filling operation or when fluid is being withdrawn therefrom.

As will be seen on the drawings, the cylindrical portion 13 of the adapter 10 may be provided with a suitable radial rib so as to cooperatively seat an O ring 18 for effectively sealing the bung bushing seat.

A boss is provided on the cylindrical portion 13 of the adapter 10 to pivotally support a dirt eliminator valve 19. The dirt eliminator valve 19 may be normally loaded, as for example, by a torsion spring 20 and may further be provided with a gasket 21 made of any suitable sealing material arranged to seat on the annular shoulder presented by the cylindrical portion 13 of the adapter 10 thereby preventing water, dirt and other foreign particles from entering the adapter 10 when the drum or container 12 is in transit, storage, or is being positioned preliminary to the withdrawal of fluid therefrom.

As will be particularly evident from Figures 7 and 8, the adapter 10 defines a generally cylindrical fluid passageway F terminating in an annular shoulder 22 upon which a poppet valve 23 may be selectively seated to control the passage of fluid through the fluid passageway F and seal the fluid in the drum or container 12 against static load, fume pressure, and the possible admission of air due to any vacuum that may be developed within the drum or container 12 from any cause.

More specifically, the poppet valve 23 includes a hollow valve seat having an annular gasket 23a thereon for cooperating with the shoulder 22 and being threadedly engageable with a venting tube 24.

A retainer 26, generally cup-shaped with a reduced diameter cylindrical neck portion, is firmly assembled upon a pair of supporting prongs 13a which extend away from the cylindrical portion 13 of the adapter 10 (Figure 8).

A coil spring 27 is seated in the retainer 26 and abuts the valve seat of the poppet valve 23 to normally bias the seat toward a closed position against the shoulder 22. The venting tube 24 is disposed within the center of the spring 27 and extends through the hollow cylindrical neck of the retainer 26.

Affixed to the end of the venting tube 24 is an air inlet valve 28 which is preferably made of a flexible material such as extruded rubber to define a pair of flat side walls (Figures 7 and 8) characteristic of the so-called flapper type check valve.

The other end of the venting tube 24, in addition to being constructed for assembly to the hollow valve seat of the poppet valve 23, defines a small counter-bore in which is seated a coil spring 29 which serves to normally load a check valve 30 into seating relationship against the bevelled shoulder defined within the hollow bore of the poppet valve 23 seat member. The check valve 30 may conveniently comprise a small disk carrying an O ring engageable with the bevelled shoulder and operative to effectively seal the air passageway defined by the venting tube 24 and the hollow bore of the seat member.

A reciprocable sleeve 31 connected with the check valve 30 is supported for sliding movement within a cylindrical bore by the seat member of the poppet valve 23. As shown in Figures 1, 7 and 8, the sleeve 31 normally projects beyond the confines of the seat member and operates to unseat the check valve upon being moved inwardly in a manner to be described with greater detail hereinafter.

Referring particularly to Figures 1 through 4, the spigot 11 is shown as including a generally cylindrical barrel portion 32 terminating in a depending handle portion 33. Suitable bosses may be provided to pivotally support a lever arm indicated generally by the reference numeral 33.

A centering piece 34 is situated in the end of the barrel 32 and defines a counterbored passage for seating an air venting tube extension 36 and a seating gasket 37.

A pair of annular grooves may be cut in the periphery of the barrel 32 near the open end thereof to receive a snap-type locking ring 38 and an O-type sealing ring 39. The internal bore of the adapter 10 of the cylindrical portion 23 is provided with a suitable groove 40 (Figures 1, 6, 7 and 8) and the O-type ring 39 is adapted to snugly engage the walls of the cylindrical bore defined by the cylindrical section 23 of the adapter 10.

The end of the barrel 32 of the spigot 11 may be bevelled to abut the should 22 defined by the adapter 10. Thus, the barrel 32 may be easily inserted into the adapter 10 and sealingly locked therein because of the cooperative relationship between the locking ring 38 and the groove 40 and between the O ring 39 and the cylindrical portion 23 of the adapter 10.

Making particular reference to Figures 1 and 3, it will be noted that the dirt eliminating valve 19 is provided with a projecting lug 19a which is constructed to cooperate with a suitable annular lug 32a formed on the periphery of the barrel 32. When the spigot 11 is in the non-flow or lap position, it will be conveniently retained in such a position by virtue of the cooperation between the lug 19a and the lug 32a (Figure 1). In this position the centering piece 34 is out of contact with the sleeve 31 and the poppet valve 23 is firmly seated on the shoulder 22 of the adapter 10.

In the flow and venting position (Figure 3) the barrel 32 of the spigot 11 is fully inserted into the adapter 10 until it abuts the shoulder 22 and is firmly locked in position by the seating of snap-type ring 38 in the groove 40. It will be noted that the lug 19a slides freely on the peripheral surface of the barrel portion 32 of the spigot 11.

In this position, the centering piece 34 engages the sleeve 31 and slidably moves the sleeve 31 so as to unseat the check valve 30. At the same time, the gasket 37 snugly engages the end of the hollow valve seat of the poppet valve 23 thereby sealing and completing the venting tube air passage through the vent tube 24, the sleeve 31 and the vent tube extension 36. Moreover, the centering piece 34 moves the hollow seat member of the poppet valve 23 against the bias of the spring 27 away from the shoulder 22 thereby opening the poppet valve 23.

As shown on the drawings, the handle portion 33 of the spigot 11 may be provided with an aperture or window as at 33a. A sleeve 41 made of a suitable rubber-like elastic material is fastened around the handle portion 33 of the spigot 11 so as to encase the handle and cover the aperture 33a. A plunger 42, herein shown as a finger-like projection made of a material similar to hard molded rubber, may be fastened to the lever 35 so as to lie in registry with the aperture 33a.

Inasmuch as the spigot 11 is of a general configuration resembling a pistol, the handle portion 33 may be normally clenched when it is desired to insert the barrel 32 into the adapter 10, thereby simultaneously depressing the lever 35 so as to depress the plunger 42 against the elastic sleeve 41, as shown in Figures 3 and 4, to seal the fluid passageway defined by the spigot 11. Thus, when the spigot 11 is completely inserted into the adapter 10, as shown in Figures 3 and 4, and held with the lever 35 depressed, the spigot 11 will be completely filled with liquid. By releasing the lever 35, the elastic sleeve 41 will again assume its normal position and a siphon effect will be developed by virtue of the fluid flow which is initiated through the spigot 11.

As will be evident from the drawings, when the spigot 11 is in the flow and venting position as shown in Figure 3, and if there is no fume pressure in the drum or container 12 and a vacuum is being developed, air will freely vent into the container or drum 12 in proportion to the liquid flow rate without the possibility of any backflow of liquid through the vent tube arrangement. This feature is present because the vent tube 24, the sleeve 31 and the vent tube extension 36 form a completely closed venting passageway which extends outwardly through the barrel 32 of the spigot 11 and communicates with the atmosphere. The air inlet valve 28 of course operates in a well-known manner characteristic of its construction as a check valve in that air may freely vent into the drum or container 12, but back-flow of fluid through the air inlet valve 28 is effectively precluded.

When the desired amount of fluid has been withdrawn, the spigot 11 need simply be pulled to a non-flow position. The spigot is then conveniently positioned for quick withdrawal of additional fluid or the spigot 11 may be conveniently and quickly removed from the adapter 10 by simply lifting the dirt eliminator valve 19 free of the shoulder 32a to permit withdrawal of the spigot 11, whereupon the dirt eliminator valve 19 will automatically close as shown in Figures 7 and 8.

It will be noted upon making reference to Figures 1, 3, 7 and 8 that the venting tube 24 is provided with a recessed portion 43 which is flanked by appropriate O-type ring gaskets. The recessed portion 43 is situated near the end of the venting tube 24 so as to be normally closed by the valve guide portion of the retainer 26. This provision is made so that a filling nozzle may be inserted into the adapter 10 to move the poppet valve 23 from its seat a predetermined greater distance than it is normally moved by a spigot structure so as to position the recessed portion 43 beyond the end of the retainer 26. When so positioned, air or fumes will flow through the vent tube 24 and the sleeve 31 to the atmosphere or filling source, depending upon the venting system which may be employed.

Figure 6 shows how a tamper-proof cap 43 may be easily crimped in place over the end of the cylindrical portion 13 of the adapter 10, thereby making it impossible to unscrew the adapter or open the dirt eliminating valve 19 without such an act being known. The tamper-proof cap 43 also serves to lock the valve 19 in a closed position during transit and storage.

It will be apparent from the foregoing description that we have described a new and improved spigot and adapter structure for automatically venting air or fumes to a drum or container from which fluid, such as a highly volatile liquid, may be drawn.

It will be understood that modifications and variations may be effected without departing from the scope of the novel concepts of the present invention.

We claim as our invention:

1. In an apparatus adapted for drawing liquid through a bushing carried by a container, an adapter having a fluid-carrying bore and means for mounting in the bushing, said adapter defining a valve seat and carrying a loaded, normally closed poppet valve therein for controlling the flow of fluid through said adapter, said adapter further defining an air venting passageway arranged to extend into the container, a loaded normally closed check valve at one end of the air passageway to prevent fluid flow through said passageway, a rubber air inlet valve on the other end of said passageway, and a spigot structure having a tubular portion adapted for mating entrance into the bore of said adapter, abutment means cooperating between said poppet valve and said spigot to unseat said poppet valve, said spigot having air venting means therein to engage and unseat said check valve upon entrance into the adapter, whereby fluid may be selectively drawn from and replacement fluid vented into the container in one simultaneous operation.

2. A drainage control comprising, in combination, an adapter element defining a generally cylindrical flow passage, a poppet valve in said adapter in control of said flow passage, an independent venting duct extending into the container and defined by said adapter, check valve means in control of said venting duct, and a spigot structure, said spigot being generally pistol-shaped with a generally tubular barrel portion adapted to be reciprocably positioned in the adapter flow passage, said spigot structure further defining a hollow handle portion depending from the end thereof, said handle portion having a window formed therein, a resilient sheet of flexible material covering the window, a lever pivotally carried by the handle portion, a depresser finger on the lever in registry with the window, said lever and finger cooperable with the handle portion to collapse the flexible material inwardly, thereby sealing off the spigot when the handle and the lever are simultaneously gripped as in clinching a pistol, said spigot structure further defining an independent venting duct therethrough cooperably registerable with the venting duct in said adapter, and abutment means cooperating between said spigot and said poppet valve and between said spigot and said check valve means to unseat said poppet valve and said check valve means, whereby the sealed off spigot may be inserted into the adapter to unseat the poppet valve and the check valve means for initiating a self-venting flow through the spigot upon release of the handle lever.

3. A mechanism for effecting the flow of fluid from a closed body comprising a female element defining a hollow bore for establishing a flow passage, an independent venting duct therein, a rubber sleeve on the end of the independent venting duct, valve means in the bore for controlling the flow of fluid therethrough, and a male spigot selectively insertable in the bore of said female element for unseating the valve means, said male spigot having a flexible sealing diaphragm in a portion thereof, whereby said male spigot may be effectively sealed upon insertion into the female element and opened thereafter in order to establish a vented flow of fluid through said adapter and said spigot.

4. A drum cap and spigot assembly comprising a bushing ring adapted to be secured in a drum bushing or the like fitted in the drum outlet of a container, a spring biased control valve having a venting passageway therethrough and coacting with said ring to control fluid flow therethrough, a spigot removably insertable into said ring and adapted to open said control valve, retaining means holding said spigot in said ring in a control valve opening position, a vent tube extending through the spigot, and a spring biased vent valve means in said control valve adapted to be opened by said vent tube when the spigot is inserted in the bushing ring including means confining the flow of venting air from said vent tube into said venting passageway, and check valve means in said venting passageway, whereby the container will be separately vented when being drained.

5. A drum cap and spigot assembly comprising a bushing ring adapted to be secured in a drum bushing or the like, a spring biased control valve on said ring, said control valve having a vent passageway therethrough, a vent valve controlling flow through said passageway, a spigot insertable into said bushing ring, a vent tube in said spigot adapted to communicate with the vent passageway in said valve, said valve having cooperating means cooperable with said spigot for opening both valves when the spigot is fully seated in the bushing ring.

6. A drum drainage device comprising a spigot having one end adapted to be inserted into a drum outlet, a spring urged cover flap for said drum outlet, and mating lugs on the flap and spigot providing shoulders engaging one another for retaining said spigot end in the outlet.

7. A drum drainage device comprising an angled spigot having one leg adapted to be inserted in the drum outlet and the other leg depending therefrom with a window opening on the outer side thereof, a flexible cover closing said window, a trigger-like lever pivoted on the spigot, means on said lever for deflecting said cover through the window to seal the depending leg when the lever is depressed, said trigger-like lever and said other leg forming together with one another a unitary handle grip adapted to be substantially embraced to concurrently depress said trigger-like lever upon inserting said one leg in the drum outlet, a spring urged cover flap for said drum outlet, and coacting means on the flap and said one leg of said spigot retaining said spigot in the outlet.

8. A drum drainage device comprising an angled spigot having one leg adapted to be inserted in the drum outlet and the other leg depending therefrom with a window opening on the outer side thereof, a flexible cover closing said window, a trigger-like lever pivoted on the spigot, means on said lever for deflecting said cover through the window to seal the depending leg when the lever is depressed, said trigger-like lever and said other leg forming together with one another a unitary handle grip adapted to be substantially embraced to concurrently depress said trigger-like lever upon inserting said one leg in the drum outlet, a spring urged cover flap for said drum outlet, and coacting means on the flap and said one leg of said spigot retaining said spigot in the outlet, said one leg of said spigot being further provided with a vent tube extending coaxially therethrough, said vent tube having means on the innermost end thereof and adapted to cooperate with valve means and an outlet at the outermost end thereof to bleed air into the drum being drained irrespective of the position of said trigger-like lever.

9. In an apparatus adapted for drawing liquid from a hole of a closed container, an adapter ring constructed to be attached to the hole of the container and providing a flow passage therethrough, a poppet valve carried by said ring and seating against one end of said ring to close said flow passage, duct means in said valve and extending into the container and providing an independent venting duct coaxially aligned in said flow passage, and a pressure responsive check valve of the type adapted to be operative though submerged in liquid and being located on the inner end of said duct means adjacent said poppet valve and below the level of liquid in the container to automatically vent replacement fluid inwardly upon withdrawal of container fluid outwardly through said fluid passage without admitting container fluid into the venting duct.

10. A drum drainage unit comprising a spigot having a first hollow leg forming a flow passage on a first axis adapted to intersect the drainage opening of a drum in which the spigot is inserted, a second hollow leg on said spigot depending generally from said first hollow leg and having a flow passage formed therein on a second axis angularly offset from said first axis, said flow passages of both of said legs intersecting to form a unitary angled flow passage, said second leg having a window formed in the walls thereof, a flexible cover closing said window, a lever arm having one end pivotally connected to said spigot and having the other end thereof depending generally with respect to said first hollow leg and into generally parallel relationship with respect to said second hollow leg, said lever arm having a protuberance adjacent said other end extending generally normal to the axis of said lever arm and being located in register with said window to engage the outside of said flexible cover, said protuberance holding said lever arm in angularily offset position outwardly of said second leg, said protuberance having an end surface shaped to conform generally to the walls of said second leg opposite said window, and coextensive manually embraceable surfaces formed on the outside of said lever arm and the outside of said second leg engaged concurrently by one hand of an operator to move said lever arm into parallel relation with said second leg, thereby forming a unitary hand grip, whereupon said flexible cover is deflected through said window by said protuberance for sealing said second leg and said spigot may be inserted by the operator into the drum opening.

11. A self venting fluid drainage apparatus, comprising a drain bushing for a drum or the like, a spigot having an end inserted in said bushing, said bushing having a fluid flow passageway formed therein, closure means comprising a poppet valve carried in said bushing and closing said passageway, said spigot having said end engaging and opening said poppet value to control the flow of fluid through said passageway, a venting duct in said spigot, a venting duct in said poppet valve in register with said venting duct in said spigot, and a check valve means for said venting duct in said poppet valve carried by said poppet valve, said spigot engaging said check valve means to control venting flow through both of said venting ducts when said spigot is inserted into said bushing, whereby drainage of fluid from and venting to the container may occur simultaneously.

References Cited in the file of this patent
UNITED STATES PATENTS

| | | |
|---|---|---|
| 129,090 | Bourgeois | July 16, 1872 |
| 162,608 | Boettcher | Apr. 27, 1875 |
| 167,049 | Adam | Aug. 24, 1875 |
| 180,560 | Dreyfus | Aug. 1, 1876 |
| 190,350 | Messmer | May 1, 1877 |
| 248,262 | Paulfranz | Oct. 11, 1881 |
| 250,085 | Lillis | Nov. 29, 1881 |
| 261,354 | Johnson | July 18, 1882 |
| 375,076 | Langstaff | Dec. 20, 1887 |
| 539,714 | Wather et al. | May 21, 1895 |
| 1,096,278 | Sutton | May 12, 1914 |
| 1,717,471 | Spencer | June 18, 1929 |
| 2,099,591 | Barrott | Nov. 16, 1937 |
| 2,239,921 | Majewski | Apr. 29, 1941 |
| 2,264,671 | Kocher | Dec. 2, 1941 |
| 2,349,137 | Brown | May 16, 1944 |
| 2,463,922 | Turner | Mar. 8, 1949 |
| 2,539,349 | Giles | Jan. 23, 1951 |